United States Patent
Miyamoto et al.

(10) Patent No.: US 11,967,081 B2
(45) Date of Patent: Apr. 23, 2024

(54) INFORMATION PROCESSING APPARATUS, NON-TRANSITORY COMPUTER-READABLE STORAGE MEDIUM, AND INFORMATION PROCESSING METHOD

(71) Applicant: Mitsubishi Electric Corporation, Tokyo (JP)

(72) Inventors: Ken Miyamoto, Tokyo (JP); Takeru Shiraga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 468 days.

(21) Appl. No.: 17/378,531

(22) Filed: Jul. 16, 2021

(65) Prior Publication Data
US 2021/0342572 A1 Nov. 4, 2021

Related U.S. Application Data

(63) Continuation of application No. PCT/JP2019/001753, filed on Jan. 22, 2019.

(51) Int. Cl.
*G06K 9/00* (2022.01)
*G06T 7/11* (2017.01)
*G06V 20/64* (2022.01)

(52) U.S. Cl.
CPC ................ *G06T 7/11* (2017.01); *G06V 20/64* (2022.01)

(58) Field of Classification Search
CPC .................................. G06T 7/11; G06V 20/64
(Continued)

(56) References Cited

U.S. PATENT DOCUMENTS

2016/0132755 A1 5/2016 Ikeda
2018/0082178 A1 3/2018 Nakamura et al.

FOREIGN PATENT DOCUMENTS

CN 109146830 A 1/2019
JP 2014-178957 A 9/2014
(Continued)

OTHER PUBLICATIONS

Wang, Ying, et al. "Edge extraction by merging the 3D point cloud and 2D image data." Automation, Communication and Cybernetics in Science and Engineering 2013/2014 (2014): 773-785. (Year: 2014).*
(Continued)

*Primary Examiner* — Jonathan S Lee
(74) *Attorney, Agent, or Firm* — BIRCH, STEWART, KOLASCH & BIRCH, LLP (57) ABSTRACT

An information processing apparatus (100) include a memory to store a plurality of background images; a sensor to acquire three-dimensional information including a plurality of images; and processing circuitry. The processing circuitry selects a recognition target from the three-dimensional information; cuts an image of a recognition target range corresponding to the selected recognition target from each of the plurality of images to generate a plurality of foreground images from the plurality of images; synthesizes each of the plurality of foreground images with each of the plurality of background images to generate a plurality of synthesized images. The processing circuitry generates recognition target range information indicating the recognition target range with three-dimensional positions of a plurality of points. The processing circuitry projects the recognition target range onto each of the plurality of images to specify the recognition target range in each of the plurality of images.

12 Claims, 5 Drawing Sheets

(58) Field of Classification Search
USPC ........................................................ 382/100
See application file for complete search history.

(56) References Cited

FOREIGN PATENT DOCUMENTS

| JP | 2017-182129 A | 10/2017 |
|---|---|---|
| JP | 2017-228874 A | 12/2017 |
| WO | WO 2014/207991 A1 | 12/2014 |

OTHER PUBLICATIONS

Budzan, Sebastian. "Fusion of visual and range images for object extraction." International Conference on Computer Vision and Graphics. Cham: Springer International Publishing, 2014. (Year: 2014).*

Goyal, Manik, et al. "Dataset augmentation with synthetic images improves semantic segmentation." Computer Vision, Pattern Recognition, Image Processing, and Graphics: 6th National Conference, NCVPRIPG 2017, Mandi, India, Dec. 16-19, 2017, Revised Selected Papers 6. Springer Singapore, 2018. (Year: 2018).*

Li, Bo, Tianlei Zhang, and Tian Xia. "Vehicle detection from 3d lidar using fully convolutional network." arXiv preprint arXiv:1608.07916 (2016). (Year: 2016).*

Goyal et al., "Dataset Augmentation with Synthetic Images Improves Semantic Segmentation", arXiv:1709.00849v3, Jun. 26, 2018, total 13 pages.

Rother et al., "GrabCut—Interactive Foreground Extraction using Iterated Graph Cuts", Microsoft Research Cambridge, UK, 2004, pp. 309-314.

Bohg et al., "Robot Arm Pose Estimation through Pixel-Wise Part Classification," 2014 IEEE International Conference on Robotics & Automation (ICRA), Hong Kong, China, May 31-Jun. 7, 2014, pp. 3143-3150, 8 pages total.

German Office Action for German Application No. 112019006288.3, dated Nov. 15, 2021, with an English translation.

Taiwanese Office Action and Search Report for Taiwanese Application No. 108127864, dated Dec. 27, 2021, with English translation of the Office Action.

Office Action dated May 24, 2022 in counterpart Indian Patent Application No. 202147031713.

* cited by examiner

INFORMATION PROCESSING APPARATUS, NON-TRANSITORY COMPUTER-READABLE STORAGE MEDIUM, AND INFORMATION PROCESSING METHOD

CROSS-REFERENCE TO RELATED APPLICATION

This application is a continuation application of International Application No. PCT/JP2019/001753 having an international filing date of Jan. 22, 2019, the disclosure of which is incorporated herein by reference in its entirety.

BACKGROUND OF THE INVENTION

1. Field of the Invention

The present disclosure relates to an information processing apparatus, a non-transitory computer-readable storage medium, and an information processing method.

2. Description of the Related Art

In the field of image processing, a technique of learning a large number of images to recognize an object has been proposed. Images of people or cars can be prepared in large amount by using open source. However, it is difficult to collect a large number of images of a particular object, such as a particular car, equipment, or product.

For example, Non-Patent Document 1 proposes a method for preparing a large number of images of a specific object by creating foreground images rendered from a three-dimensional model of the object at a plurality of positions and at a plurality of angles, and then pasting the foreground images onto a plurality of background images prepared in advance.

Non-Patent Document 1: Manik Goyal, Param Rajpura, Hristo Bojinov, and Ravi Hegde, "Dataset Augmentation with Synthetic Images Improves Semantic Segmentation", arXiv: 1709.00849v3, Jun. 26, 2018

SUMMARY OF THE INVENTION

The conventional technique is effective when the shape and texture of the three-dimensional model are in high definition.

There are two methods of creating a three-dimensional model as follows.

The first method is to create a three-dimensional model manually. However, there is a problem that this method is very time consuming.

The second method is a method of preparing a special environment such as a turntable to create a three-dimensional model. However, there is a problem that this method cannot create a three-dimensional model unless the object is of a weight and size that a special environment such as a turntable allows.

As described above, since it is not feasible to create a high-definition three-dimensional model of a specific object, the conventional technique lacks practicability.

Accordingly, an object of one or more aspects of the present invention is to make it possible to easily generate a large number of images of a particular object.

An information processing apparatus according to a first aspect of the present disclosure includes: a memory to store a plurality of background images; a sensor to acquire three-dimensional information including a plurality of images; and processing circuitry. The processing circuitry selects a recognition target from the three-dimensional information; cuts an image of a recognition target range corresponding to the selected recognition target from each of the plurality of images to generate a plurality of foreground images from the plurality of images; and synthesizes each of the plurality of foreground images with each of the plurality of background images to generate a plurality of synthesized images. The processing circuitry generates, from at least one image included in the plurality of images, recognition target range information indicating the recognition target range with three-dimensional positions of a plurality of points included in the at least one image. The processing circuitry projects the recognition target range onto each of the plurality of images to specify the recognition target range in each of the plurality of images.

An information processing apparatus according to a second aspect of the present disclosure includes: a memory to store a plurality of background images; a sensor to acquire three-dimensional information including a plurality of images and positional information indicating three-dimensional positions of each of the plurality of points included in each of the plurality of images; and processing circuitry. The processing circuitry selects a recognition target from the three-dimensional information; cuts an image of a recognition target range corresponding to the selected recognition target from each of the plurality of images to generate a plurality of foreground images from the plurality of images; and synthesizes each of the plurality of foreground images with each of the plurality of background images to generate a plurality of synthesized images. The processing circuitry selects three-dimensional positions of a plurality of points included in at least one image included in the plurality of images from the positional information and generates recognition target range information indicating the recognition target range with the selected positions. The processing circuitry projects the recognition target range onto each of the plurality of images to specify the recognition target range in each of the plurality of images.

A non-transitory computer-readable storage medium according to a first aspect of the present disclosure stores a program that causes a computer to execute processing including: selecting a recognition target from three-dimensional information including a plurality of images; cutting an image of a recognition target range corresponding to the selected recognition target from each of the plurality of images to generate a plurality of foreground images from the plurality of images; storing a plurality of background images; and synthesizing each of the plurality of foreground images with each of the plurality of background images to generate a plurality of synthesized images. In selecting the recognition target from the three-dimensional information, recognition target range information is generated from at least one image included in the plurality of images. The recognition target range information indicats the recognition target range with three-dimensional positions of a plurality of points included in the at least one image. In generating the plurality of foreground images from the plurality of images, the recognition target range is projected onto each of the plurality of images to specify the recognition target range in each of the plurality of images.

A non-transitory computer-readable storage medium according to a second aspect of the present disclosure stores a program that causes a computer to execute processing including: selecting a recognition target from three-dimensional information including a plurality of images and positional information indicating three-dimensional positions of each of the plurality of points included in each of the plurality of images; cutting an image of a recognition target range corresponding to the selected recognition target from each of the plurality of images to generate a plurality of foreground images from the plurality of images; storing a plurality of background images; and synthesizing each of the plurality of foreground images with each of the plurality of background images to generate a plurality of synthesized images. In selecting the recognition target from the three-dimensional information, three-dimensional positions of a plurality of points included in at least one image included in the plurality of images is selected from the positional information to generate recognition target range information indicating the recognition target range with the selected positions. In generating the plurality of foreground images from the plurality of images, the recognition target range is projected onto each of the plurality of images to specify the recognition target range in each of the plurality of images.

An information processing method according to a first aspect of the present disclosure includes: acquiring three-dimensional information including a plurality of images; selecting a recognition target from the three-dimensional information; cutting an image of a recognition target range corresponding to the selected recognition target from each of the plurality of images to generate a plurality of foreground images from the plurality of images; and synthesizing each of the plurality of foreground images with each of the plurality of background images to generate a plurality of synthesized images. In selecting the recognition target from the three-dimensional information, recognition target range information is generated from at least one image included in the plurality of images. The recognition target range information indicats the recognition target range with three-dimensional positions of a plurality of points included in the at least one image. In generating the plurality of foreground images from the plurality of images, the recognition target range is projected onto each of the plurality of images to specify the recognition target range in each of the plurality of images.

An information processing method according to a second aspect of the present disclosure includes acquiring three-dimensional information including a plurality of images and positional information indicating three-dimensional positions of each of the plurality of points included in each of the plurality of images; selecting a recognition target from the three-dimensional information; cutting an image of a recognition target range corresponding to the selected recognition target from each of the plurality of images to generate a plurality of foreground images from the plurality of images; and synthesizing each of the plurality of foreground images with each of the plurality of background images to generate a plurality of synthesized images. In selecting the recognition target from the three-dimensional information, three-dimensional positions of a plurality of points included in at least one image included in the plurality of images is selected from the positional information to generate recognition target range information indicating the recognition target range with the selected positions. In generating the plurality of foreground images from the plurality of images, the recognition target range is projected onto each of the plurality of images to specify the recognition target range in each of the plurality of images.

According to one or more aspects of the present disclosure, a large number of images of a particular object can be easily generated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
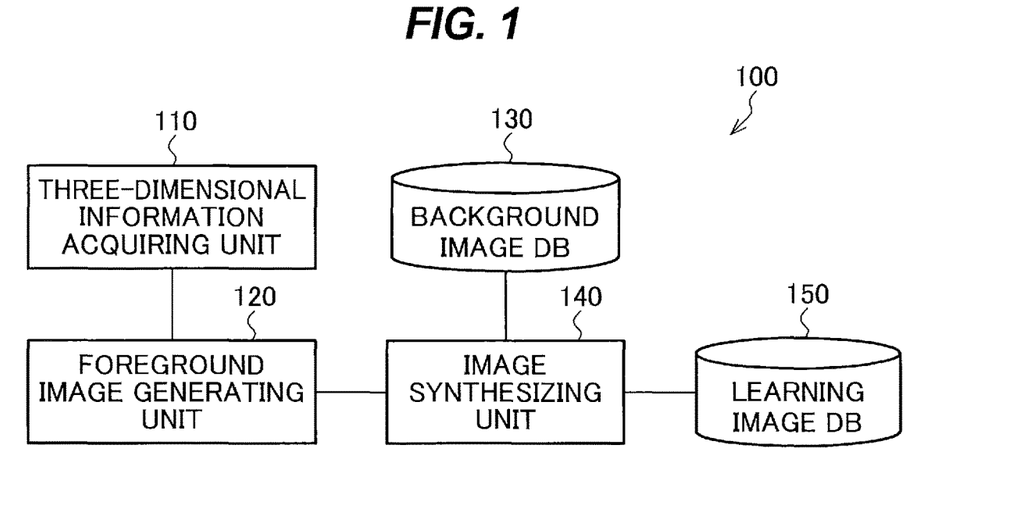
FIG. 1 is a block diagram schematically illustrating a configuration of an information processing apparatus according to an embodiment.

FIG. 1 is a block diagram schematically illustrating a configuration of an information processing apparatus 100 according to an embodiment.

The information processing apparatus 100 includes a three-dimensional information acquiring unit 110, a foreground image generating unit 120, a background image database (hereinafter referred to as background image DB) 130 as a background image storing unit, an image synthesizing unit 140, and a learning image database (hereinafter referred to as a learning image DB) 150 as a learning image storing unit.

The three-dimensional information acquiring unit 110 acquires three-dimensional information including a plurality of images and positional information indicating the three-dimensional positions of a plurality of points included in each of the plurality of images. For example, the three-dimensional information acquiring unit 110 acquires the three-dimensional information by using Simultaneous Localization And Mapping (SLAM) or the like.

In the present embodiment, the three-dimensional information includes, for example, a plurality of images captured from a plurality of capturing positions or at a plurality of angles, such as a plurality of viewpoints or angles, and three-dimensional point group information which is positional information indicating the three-dimensional positions (e.g., three-dimensional coordinates) of a plurality of points included in each of the plurality of images. Further, the three-dimensional information may include the plurality of images and sensor information indicating the positions and angles from/at which the plurality of images are captured. Note that the three-dimensional positions of a plurality of points indicated by the positional information is also referred to as a three-dimensional point group.

Here, an example in which the three-dimensional information acquiring unit 110 is implemented by a Red Green Blue-Depth (RGB-D) camera will be described.

If the position of a point l (l=1, 2, . . . , $L_f$) obtained when an image f (f=1, 2, . . . , F) is captured from a certain viewpoint is $q_{fl}$, the position $q_{fl}$ is obtained by the following equation (1).

$$q_{fl} = d_{fl} K^{-1} q'_l \quad \text{[equation 1]}$$

F is the number of images captured during SLAM processing and is an integer greater than or equal to 1.

$L_f$ is the number of pixels for which a distance is obtained in each image and is an integer greater than or equal to 1.

K is an internal parameter of the RGB-D camera and is a parameter indicating a focal point, a lens center, or the like.

$q'_1$ is the coordinate of the pixel of the image for which the distance is obtained. For example, as shown in the following equation (2), $q'_1$ is expressed by the coordinates of the number of pixels $u_l$ in the horizontal direction and the number of pixels $v_l$ in the vertical direction with the origin located at the top left corner of the image.

[equation 2]

$$q'_l = \begin{pmatrix} u_l \\ v_l \\ 1 \end{pmatrix} \quad (2)$$

Here, $d_{fl}$ is the distance from the capturing position to the object corresponding to the point l of the image f. The distance $d_{fl}$ is obtained from the Depth channel of the RGB-D camera.

Figure 2:
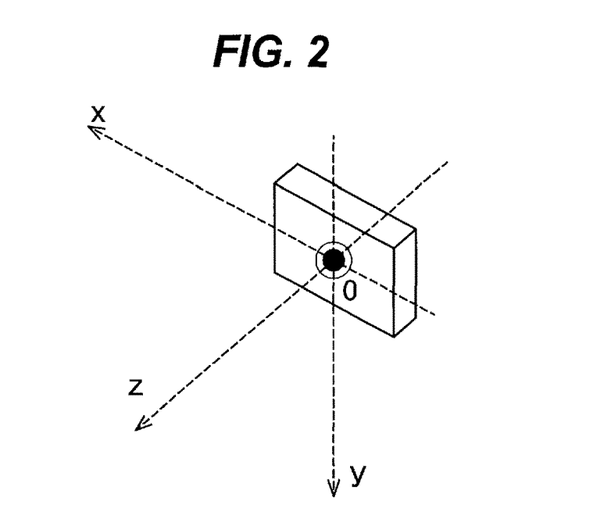
FIG. 2 is a schematic diagram for illustrating a coordinate system in three dimensions.

The point $q_{fl}$ is represented by a coordinate system as shown in FIG. 2 in which the camera position is the origin, the optical axis direction is the z-axis, the lateral direction is the x-axis, and the longitudinal direction is the y-axis.

Here, the point $p_{fl}$ is indicated by a coordinate system with the origin located at the capturing position with respect to the camera. In order to create a large-scale point group by integrating the point groups obtained when each image is captured, it is necessary to express the point groups in a unified coordinate system. In general, the coordinate system of the image captured for the first time (f=1) is used to represent the point groups obtained when another image is captured.

A flow of a typical method of converting a coordinate system to the coordinate system of the image captured for the first time is as follows.

First, local features are extracted from the first image and another image.

Next, the local features extracted from the two images are matched up.

Then, the relation between the two images (for example, the parallel translation amount and the rotation amount) is obtained by using the matched local feature pair.

The method described above is a typical method. Apart from that, for example, there is a method for obtaining the positional relation with the first image by integrating the relations of the temporally adjacent images.

When the relation between the first image and the other image f, which is obtained by such a method, is represented as $T_{1 \to f}$ each point in the coordinate system of the image captured for the first time is expressed by the following equation (3).

$$r_{fl} = T_{1 \to f}^{-1} q_{fl} \quad \text{[equation 3]}$$

The finally obtained three-dimensional point group is a set of points $r_{fl}$.

Then, the three-dimensional information acquiring unit 110 generates three-dimensional information including three-dimensional point group information indicating the three-dimensional point group detected as described above, sensor information indicating the position and angle of the image sensor of the RGB-D camera, and the images captured by the RGB-D camera. The three-dimensional information acquiring unit 110 supplies the generated three-dimensional information to the foreground image generating unit 120.

Note that the position and angle of the image sensor are the position and angle used when each image is captured. Here, the capturing position of the image is denoted as $p_n$ and the angle is denoted as $r_n$. The indices of the images are denoted as n=1, 2, . . . , N and the number of images captured is N (N is an integer greater than or equal to 2). The expression of the angle $r_n$ may take any form including Euler angle, Quaternion, or Euler-Rodrigues formula as long as a three-dimensional rotation angle can be determined.

The foreground image generating unit 120 generates a plurality of foreground images showing recognition targets from the three-dimensional information acquired by the three-dimensional information acquiring unit 110 and generates foreground image information indicating the plurality of foreground images.

Figure 3:
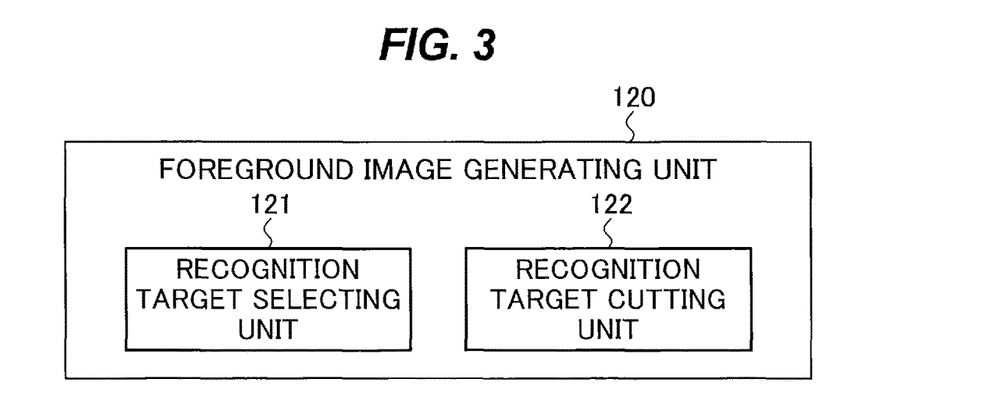
FIG. 3 is a block diagram schematically illustrating a configuration of a foreground image generating unit.

FIG. 3 is a block diagram schematically illustrating a configuration of the foreground image generating unit 120.

The foreground image generating unit 120 includes a recognition target selecting unit 121 and a recognition target cutting unit 122.

The recognition target selecting unit 121 selects the recognition target from the three-dimensional information acquired by the three-dimensional information acquiring unit 110.

The three-dimensional point group indicated by the three-dimensional point group information included in the three-dimensional information or the image included in the three-dimensional information may include an object other than the recognition target. For example, when a recognition target is placed on a floor and captured, a three-dimensional point group of the floor is also captured at the same time. In order to exclude information other than the recognition target, the recognition target selecting unit 121 selects the recognition target from the three-dimensional point group or the image. There are two patterns of selection as follows.

The first pattern is manual selection.

The recognition target selecting unit 121 displays a three-dimensional point group or an image on a display unit not shown on the basis of the three-dimensional information and receives selection of the range of the recognition target from a user via an input unit not shown.

Figure 4:
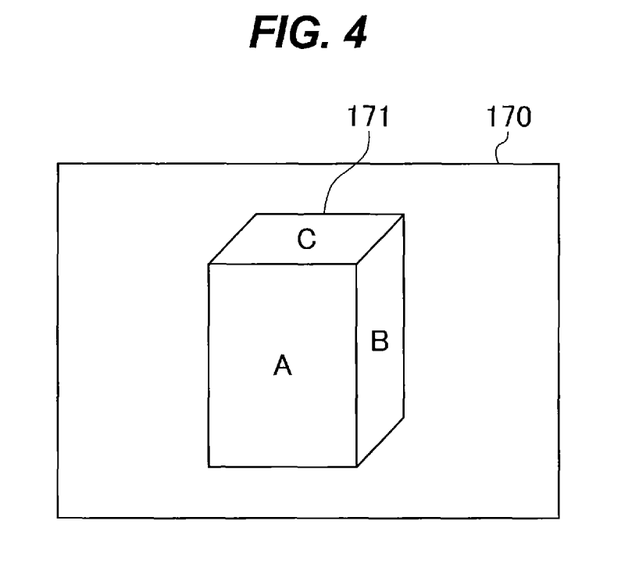
FIG. 4 is a first schematic diagram for illustrating selection of a recognition target.

A case will be described as an example, in which the image included in the three-dimensional point group information is an image 170 as shown in FIG. 4. The image 170 includes a recognition target 171.

Figure 5:
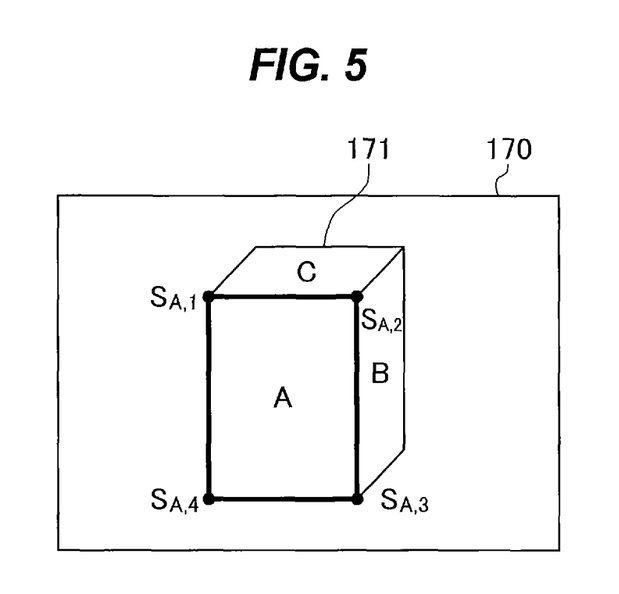
FIG. 5 is a second schematic diagram for illustrating selection of a recognition target.

In such a case, as shown in FIG. 5, the user designates four points $S_{A,1}$, $S_{A,2}$, $S_{A,3}$, and $S_{A,4}$ in the image 170 to select the recognition target 171. In this case, as shown in FIG. 5, it does not matter whether the entire of the recognition target 171 is selected at once. FIG. 5 shows an example in which only one surface A constituting the recognition target 171 is selected. After selecting the surface A, the user selects each of the surface B and the surface C, thereby finally selecting the entire of the recognition target 171.

Here, when the points $S_{A,1}$, $S_{A,2}$, $S_{A,3}$, and $S_{A,4}$ are designated as the surface A, the recognition target selecting unit 121 determines the three-dimensional coordinates, which are positions in three dimensions, corresponding to these points $S_{A,1}$, $S_{A,2}$, $S_{A,3}$, and $S_{A,4}$, by the above equations (1) and (3). It is assumed that the three-dimensional coordinates determined here are represented in a coordinate system on the basis of the start of capturing. As a result, three-dimensional coordinates $S'_{A,1}$, $S'_{A,2}$, $S'_{A,3}$, and $S'_{A,4}$ are obtained.

Figure 6:
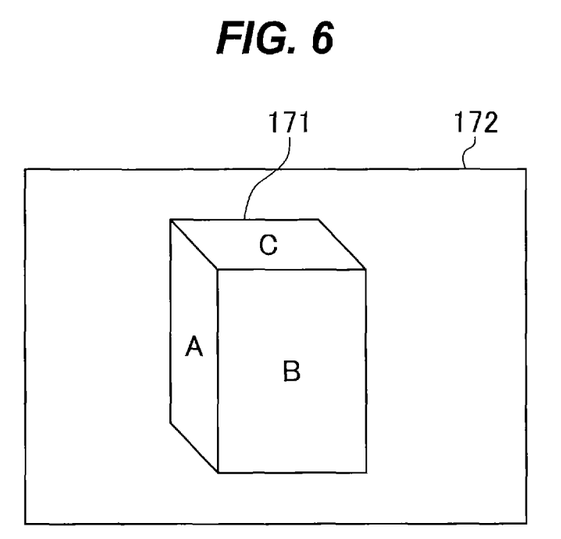
FIG. 6 is a third schematic diagram for illustrating selection of a recognition target.
Figure 7:
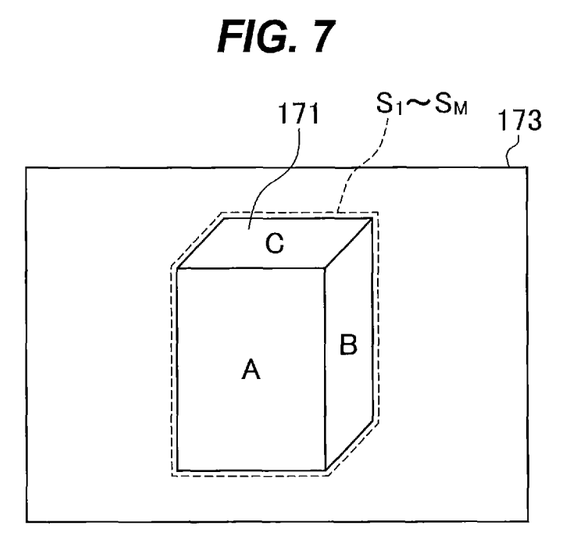
FIG. 7 is a fourth schematic diagram for illustrating selection of a recognition target.

Similarly, the selection is also performed for the surface B and the surface C. When it is difficult to select the surface B or the surface C in the image 170 shown in FIG. 4, the recognition target selecting unit 121 may accept the selection, for example, by displaying an image 172, as shown in FIG. 6, captured from another viewpoint on a display unit not shown.

By selecting the surface B and the surface C, three-dimensional coordinates $S'_{B,1}$, $S'_{B,2}$, $S'_{B,3}$, and $S'_{B,4}$ of the surface B and three-dimensional coordinates $S'_{C,1}$, $S'_{C,2}$, $S'_{C,3}$, and $S'_{C,4}$ of the surface C are determined.

When the selection is accepted from the three-dimensional point group, the user directly designates the three-dimensional coordinates $S'_{A,1}$, $S'_{A,2}$, $S'_{A,3}$, and $S'_{A,4}$ of the surface A, the three-dimensional coordinates $S'_{B,1}$, $S'_{B,2}$, $S'_{B,3}$, and $S'_{B,4}$ of the surface B, and the three-dimensional coordinates $S'_{A,1}$, $S'_{A,2}$, $S'_{A,3}$, and $S'_{A,4}$ of the surface C from the three-dimensional point group displayed on the display unit not shown.

The recognition target selecting unit 121 generates recognition target range information indicating the three-dimensional coordinates $S'_{A,1}$, $S'_{A,2}$, $S'_{A,3}$, and $S'_{A,4}$ of the surface A, the three-dimensional coordinates $S'_{B,1}$, $S'_{B,2}$, $S'_{B,3}$, and $S'_{B,4}$ of the surface B, and the three-dimensional coordinates $S'_{C,3}$, and $S'_{C,4}$ of the surface C which have been specified as described above and supplies the recognition target range information to the recognition target cutting unit 122. The recognition target range information is information indicating the range of the selected recognition target.

The second pattern for selecting the recognition target is semi-automatic selection.

The recognition target selecting unit 121 may determine the range of the recognition target by using an area division technique such as GrabCut, which is a known algorithm, to determine the boundary between the recognition target and the others. By using the region division technique, as shown in an image 173 of FIG. 8, a point group including points $S_1$ to $S_M$ (M is an integer greater than or equal to 2) indicating the boundary between the recognition target and the others can be obtained. Then, the recognition target selecting unit 121 sets the point group including the points $S'_1$ to $S'_M$ obtained by converting the point group including these points $S_1$ to $S_M$ into three-dimensional coordinates as the range of the recognition target 171. The conversion to the three-dimensional coordinates is performed by the equations (1) and (3) as described above.

The recognition target selecting unit 121 generates recognition target range information indicating the recognition target range by the three-dimensional positions of the point group including the points $S'_1$ to $S'_M$ specified as described above and supplies the recognition target range information to the recognition target cutting unit 122.

In this approach, the recognition target selecting unit 121 specifies the recognition target range from at least one image included in the three-dimensional information; however, the recognition target may be specified by using the positional information included in the three-dimensional information.

In such a case, the recognition target selecting unit 121 generates plane information indicating a plurality of planes from the positional information included in the three-dimensional information. The plane information indicates a plane corresponding to the surface of the object. Then, the recognition target selecting unit 121 may display the generated plane on the display unit and accept the selection of the recognition target or determine the boundary from the generated plane.

A typical method for detecting a plane is Random Sample Consensus (RANSAC). The method of detecting a plane by using RANSAC is as follows.

First, a plane is created by selecting several points from the three-dimensional point group.

Next, if the number of points on the plane is a predetermined number or more, the created plane is employed and if the number of points on the plane is less than the predetermined number, the created plane is rejected.

Then, the above processing is repeated to detect a plurality of planes.

The recognition target cutting unit 122 cuts an image of a recognition target range corresponding to the recognition target selected by the recognition target selecting unit 121 from each of the plurality of images included in the three-dimensional information to generate a plurality of foreground images from the plurality of images.

For example, the recognition target cutting unit 122 projects the recognition target range indicated by the recognition target range information onto the image included in the three-dimensional information and cuts the image of the projected range, thereby cutting the recognition target image that is the image of the range corresponding to the selected recognition target from the plurality of images included in the three-dimensional information.

The following equation (4) shows a method of projecting a point S' included in a recognition target range information onto an image n.

[equation 4]

$$s_n = K_n P[r_n | p_n] s' \qquad (4)$$

Here, $[r_n | p_n]$ is a matrix created on the basis of the capturing position or angle of the image n. P is a matrix for converting from a homogeneous coordinate to an ordinary coordinate system which is not the homogeneous coordinate system and is a matrix shown in the following equation (5).

[equation 5]

$$P = \begin{pmatrix} 1 & 0 & 0 & 0 \\ 0 & 1 & 0 & 0 \\ 0 & 0 & 1 & 0 \end{pmatrix} \qquad (5)$$

Further, $K_n$ represents an internal parameter corresponding to the image n of the camera and $s_n$ represents a position when the point S' is projected onto the image n.

The recognition target cutting unit 122 determines the range of the recognition target in each image by the above-described method and then cuts the range. For example, as shown in FIG. 5, when the surface A, the surface B, and the surface C are selected, the whole of these surfaces is cut as the range of the recognition target. Also, as shown in FIG. 6, a corresponding range is cut from the image 172 captured from a different viewpoint. Note that, in FIG. 6, the range corresponding to the recognition target is cut by calculating the range corresponding to the range selected in FIG. 5.

As described above, the recognition target cutting unit 122 can generate a large number of foreground images with a low processing load by cutting an image in a selected range from all images included in the three-dimensional information and using the cut image as a foreground image. Then, the recognition target cutting unit 122 supplies foreground image data, which is image data indicating a foreground image, to the image synthesizing unit 140.

The background image DB 130 stores background image data which is image data of a background image.

The image synthesizing unit 140 synthesizes the foreground image indicated by the foreground image data supplied from the foreground image generating unit 120 with the background image indicated by the background image data stored in the background image DB 130, thereby setting the synthesized image as a learning image and generating learning image data indicating the learning image. In other words, the image synthesizing unit 140 generates a plurality of synthesized images by synthesizing each of the plurality of foreground images with each of the plurality of background images.

Specifically, the image synthesizing unit 140 superimposes the foreground image on the background image. Both the background image and the foreground image may be a color image consisting of three channels of red, blue, and green, or a gray scale image having only one channel. The background image and the foreground image may also be an image including a distance indicated by a depth channel.

The image synthesizing unit 140 may also superimpose a foreground image on various positions of the background image in order to further expand the data.

The learning image DB 150 stores the learning image data generated by the image synthesizing unit 140.

Figure 8:
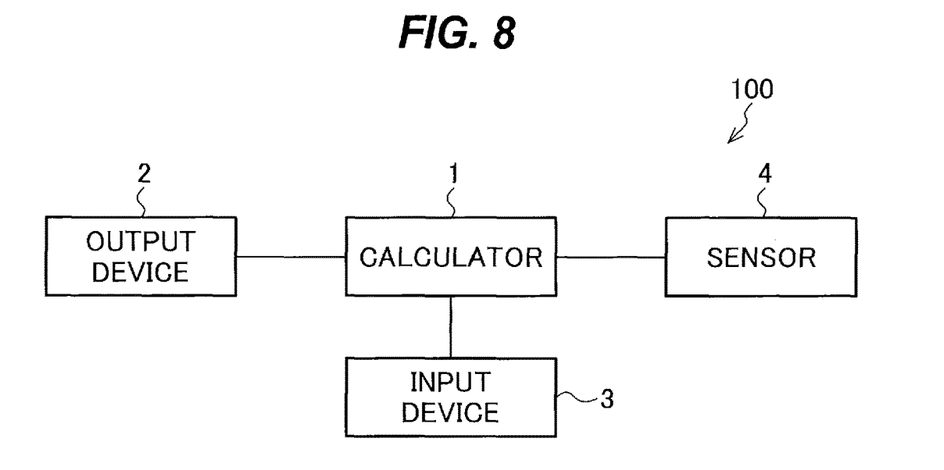
FIG. 8 is a block diagram illustrating an example of a hardware configuration of an information processing apparatus.

FIG. 8 is a block diagram illustrating an example of a hardware configuration of the information processing apparatus 100.

The information processing apparatus 100 includes a calculator 1, an output device 2, an input device 3, and a sensor 4.

The calculator 1 is a computer that can be implemented by, for example, a memory and a processor such as a Central Processing Unit (CPU) for executing a program stored in the memory. Such a program may be provided over a network or may be recorded on a recording medium (non-transitory computer-readable storage medium). That is, such a program may be provided, for example, as a program product.

Further, part of the calculator 1 may be implemented by, for example, a processing circuit such as a single circuit, a composite circuit, a programmed processor, a parallel programmed processor, an Application Specific Integrated Circuit (ASIC), or a Field Programmable Gate Array (FPGA).

Here, the foreground image generating unit 120, the background image DB 130, the image synthesizing unit 140, and the learning image DB 150 shown in FIG. 1 can be implemented by the calculator 1.

In other words, the foreground image generating unit 120 and the image synthesizing unit 140 described above can be implemented by processing circuitry.

The output device 2 is a device which functions as an output unit for displaying various screen images, such as a display.

The input device 3 is a device which functions as an input unit such as a mouse, a keyboard, and a touch panel.

The sensor 4 is a device which functions as a three-dimensional information acquiring unit 110 for acquiring three-dimensional information.

In the first embodiment, the sensor 4 is implemented by an RGB-D camera. The sensor 4 may be implemented by a combination of an Inertial Measurement Unit (IMU) or a sensor capable of obtaining a distance using infrared rays, Light Detection and Ranging (LiDAR), or ultrasonic waves and a camera capable of taking a two-dimensional image.

Figure 9:
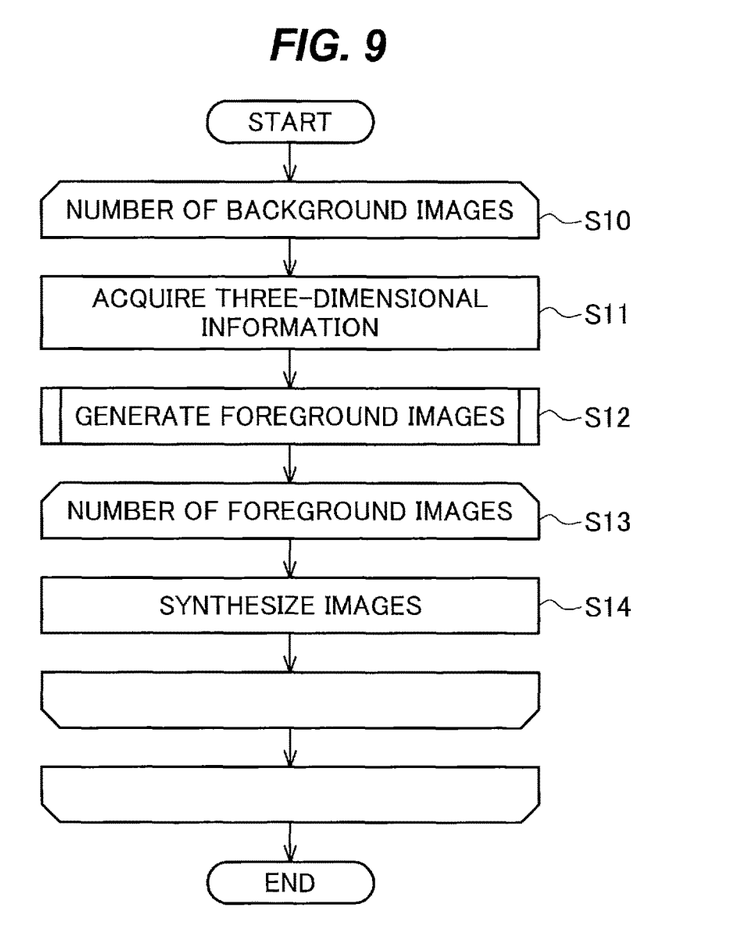
FIG. 9 is a flowchart illustrating an operation of the information processing apparatus.

FIG. 9 is a flowchart showing an operation of the information processing apparatus 100.

The information processing apparatus 100 repeats the following processing for the number of background images indicated by the background image data stored in the background image DB 130 (S10).

The three-dimensional information acquiring unit 110 acquires three-dimensional information (S11).

The foreground image generating unit 120 generates a plurality of foreground images on the basis of the three-dimensional information acquired by the three-dimensional information acquiring unit 110 (S12).

The image synthesizing unit 140 repeats the following processing for the number of foreground images generated by the foreground image generating unit 120 (S13).

The image synthesizing unit 140 synthesizes the background image indicated by the background image data stored in the background image DB 130 with the foreground image indicated by the foreground image data generated by the foreground image generating unit 120, thereby generating a learning image (S14). The learning image data indicating the learning image generated in such a way is stored in the learning image DB 150.

Figure 10:
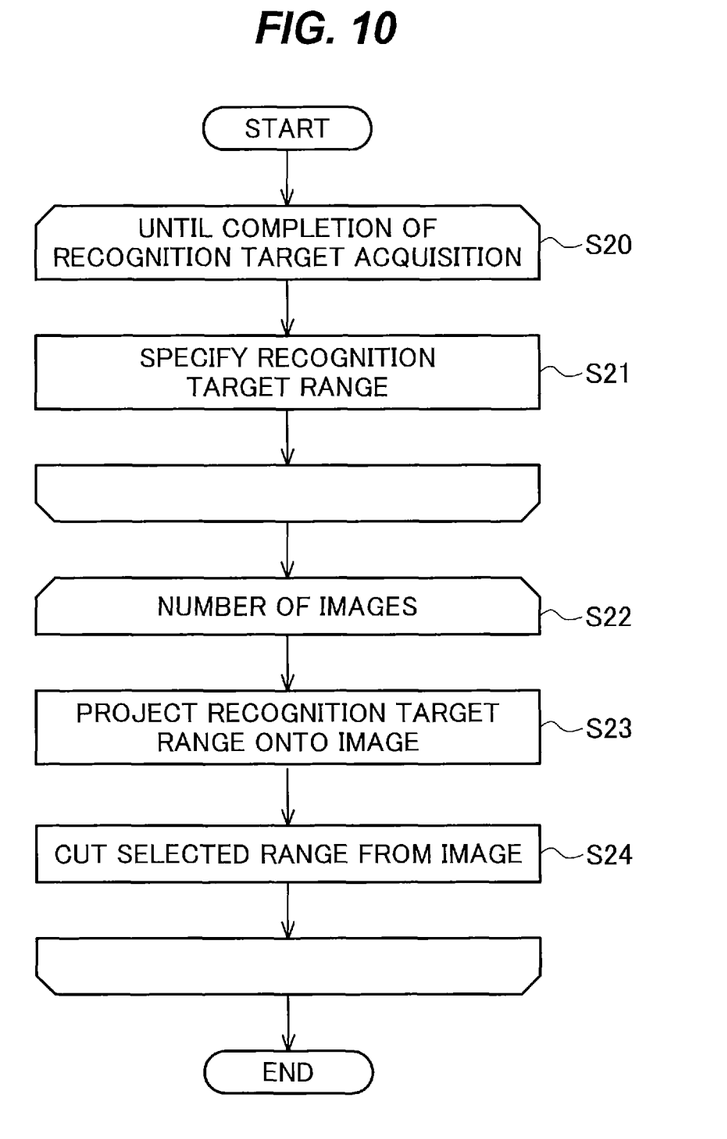
FIG. 10 is a flowchart illustrating an operation of generating a foreground image.

FIG. 10 is a flowchart showing an operation of generating a foreground image in step 12 of FIG. 9.

First, the recognition target selecting unit 121 repeats the following processing until all recognition target ranges are acquired from the three-dimensional information acquired by the three-dimensional information acquiring unit 110 (S20).

The recognition target selecting unit 121 specifies a recognition target range from a three-dimensional point group or an image included in the three-dimensional information (S21).

Next, the recognition target cutting unit 122 repeats the following processing for the number of images included in the three-dimensional information (S22).

The recognition target cutting unit 122 projects the recognition target range specified by the recognition target selecting unit 121 onto the image (S23).

Then, the recognition target cutting unit 122 cuts the projected range from the image, thereby setting the cut image as a foreground image (S24).

As described above, according to this embodiment, it is possible to create a large amount of data for learning by using three-dimensional information acquired in an ordinary environment. Therefore, it is not necessary to prepare a special environment like the conventional technology. Further, by specifying the recognition target range from one image, the same range can also be clipped from other images, so that a large number of images can be created with little effort. It is not necessary to manually create a high-definition three-dimensional model or to select a range to be recognized for all images as in the prior art.

DESCRIPTION OF REFERENCE CHARACTERS 100 information processing apparatus, 110 three-dimensional information acquiring unit, 120 foreground image generating unit, 130 background image DB, 140 image synthesizing unit, 150 learning image DB, 121 recognition target selecting unit, 122 recognition target cutting unit

What is claimed is:

1. An information processing apparatus, comprising:
a memory to store a plurality of background images;
a sensor to acquire three-dimensional information including a plurality of images; and
processing circuitry
to select a recognition target from the three-dimensional information;
to cut an image of a recognition target range corresponding to the selected recognition target from each of the plurality of images to generate a plurality of foreground images from the plurality of images;
to synthesize each of the plurality of foreground images with each of the plurality of background images to generate a plurality of synthesized images,
wherein the processing circuitry generates, from at least one image included in the plurality of images, recognition target range information indicating the recognition target range with three-dimensional positions of a plurality of points included in the at least one image, and
wherein the processing circuitry projects the recognition target range onto each of the plurality of images to specify the recognition target range in each of the plurality of images.

2. The information processing apparatus according to claim 1,
wherein the plurality of images are images obtained by capturing the recognition target from different capturing positions or at different angles.

3. The information processing apparatus according to claim 2,
wherein the processing circuitry synthesizes one foreground image included in the plurality of foreground images with one background image included in the plurality of background images at different positions in the one background image to generate a plurality of synthesized images from the combination of the one background image and the one foreground image.

4. The information processing apparatus according to claim 1,
wherein the processing circuitry synthesizes one foreground image included in the plurality of foreground images with one background image included in the plurality of background images at different positions in the one background image to generate a plurality of synthesized images from the combination of the one background image and the one foreground image.

5. An information processing apparatus, comprising:
a memory to store a plurality of background images;
a sensor to acquire three-dimensional information including a plurality of images and positional information indicating three-dimensional positions of each of the plurality of points included in each of the plurality of images; and
processing circuitry
to select a recognition target from the three-dimensional information;
to cut an image of a recognition target range corresponding to the selected recognition target from each of the plurality of images to generate a plurality of foreground images from the plurality of images;
to synthesize each of the plurality of foreground images with each of the plurality of background images to generate a plurality of synthesized images,
wherein the processing circuitry selects three-dimensional positions of a plurality of points included in at least one image included in the plurality of images from the positional information and generates recognition target range information indicating the recognition target range with the selected positions, and
wherein the processing circuitry projects the recognition target range onto each of the plurality of images to specify the recognition target range in each of the plurality of images.

6. The information processing apparatus according to claim 5,
wherein the plurality of images are images obtained by capturing the recognition target from different capturing positions or at different angles.

7. The information processing apparatus according to claim 6,
wherein the processing circuitry synthesizes one foreground image included in the plurality of foreground images with one background image included in the plurality of background images at different positions in the one background image to generate a plurality of synthesized images from the combination of the one background image and the one foreground image.

8. The information processing apparatus according to claim 5,
wherein the processing circuitry synthesizes one foreground image included in the plurality of foreground images with one background image included in the plurality of background images at different positions in the one background image to generate a plurality of synthesized images from the combination of the one background image and the one foreground image.

9. A non-transitory computer-readable storage medium storing a program that causes a computer to execute processing comprising:
selecting a recognition target from three-dimensional information including a plurality of images;
cutting an image of a recognition target range corresponding to the selected recognition target from each of the plurality of images to generate a plurality of foreground images from the plurality of images;
storing a plurality of background images; and
synthesizing each of the plurality of foreground images with each of the plurality of background images to generate a plurality of synthesized images,
wherein, in selecting the recognition target from the three-dimensional information, recognition target range information is generated from at least one image included in the plurality of images, the recognition target range information indicating the recognition target range with three-dimensional positions of a plurality of points included in the at least one image, and
wherein, in generating the plurality of foreground images from the plurality of images, the recognition target range is projected onto each of the plurality of images to specify the recognition target range in each of the plurality of images.

10. A non-transitory computer-readable storage medium storing a program that causes a computer to execute processing comprising:
selecting a recognition target from three-dimensional information including a plurality of images and positional information indicating three-dimensional positions of each of the plurality of points included in each of the plurality of images;

cutting an image of a recognition target range corresponding to the selected recognition target from each of the plurality of images to generate a plurality of foreground images from the plurality of images;
storing a plurality of background images; and
synthesizing each of the plurality of foreground images with each of the plurality of background images to generate a plurality of synthesized images,
wherein, in selecting the recognition target from the three-dimensional information, three-dimensional positions of a plurality of points included in at least one image included in the plurality of images is selected from the positional information to generate recognition target range information indicating the recognition target range with the selected positions, and
wherein, in generating the plurality of foreground images from the plurality of images, the recognition target range is projected onto each of the plurality of images to specify the recognition target range in each of the plurality of images.

11. An information processing method comprising:
acquiring three-dimensional information including a plurality of images;
selecting a recognition target from the three-dimensional information;
cutting an image of a recognition target range corresponding to the selected recognition target from each of the plurality of images to generate a plurality of foreground images from the plurality of images; and
synthesizing each of the plurality of foreground images with each of the plurality of background images to generate a plurality of synthesized images,
wherein, in selecting the recognition target from the three-dimensional information, recognition target range information is generated from at least one image included in the plurality of images, the recognition target range information indicating the recognition target range with three-dimensional positions of a plurality of points included in the at least one image, and
wherein, in generating the plurality of foreground images from the plurality of images, the recognition target range is projected onto each of the plurality of images to specify the recognition target range in each of the plurality of images.

12. An information processing method comprising:
acquiring three-dimensional information including a plurality of images and positional information indicating three-dimensional positions of each of the plurality of points included in each of the plurality of images;
selecting a recognition target from the three-dimensional information;
cutting an image of a recognition target range corresponding to the selected recognition target from each of the plurality of images to generate a plurality of foreground images from the plurality of images; and
synthesizing each of the plurality of foreground images with each of the plurality of background images to generate a plurality of synthesized images,
wherein, in selecting the recognition target from the three-dimensional information, three-dimensional positions of a plurality of points included in at least one image included in the plurality of images is selected from the positional information to generate recognition target range information indicating the recognition target range with the selected positions, and
wherein, in generating the plurality of foreground images from the plurality of images, the recognition target range is projected onto each of the plurality of images to specify the recognition target range in each of the plurality of images.

\* \* \* \* \*